A. BARCHIESI.
AUTOMATIC VALVE CLOSER.
APPLICATION FILED FEB. 20, 1920.
1,391,818.
Patented Sept. 27, 1921.
2 SHEETS—SHEET 2.
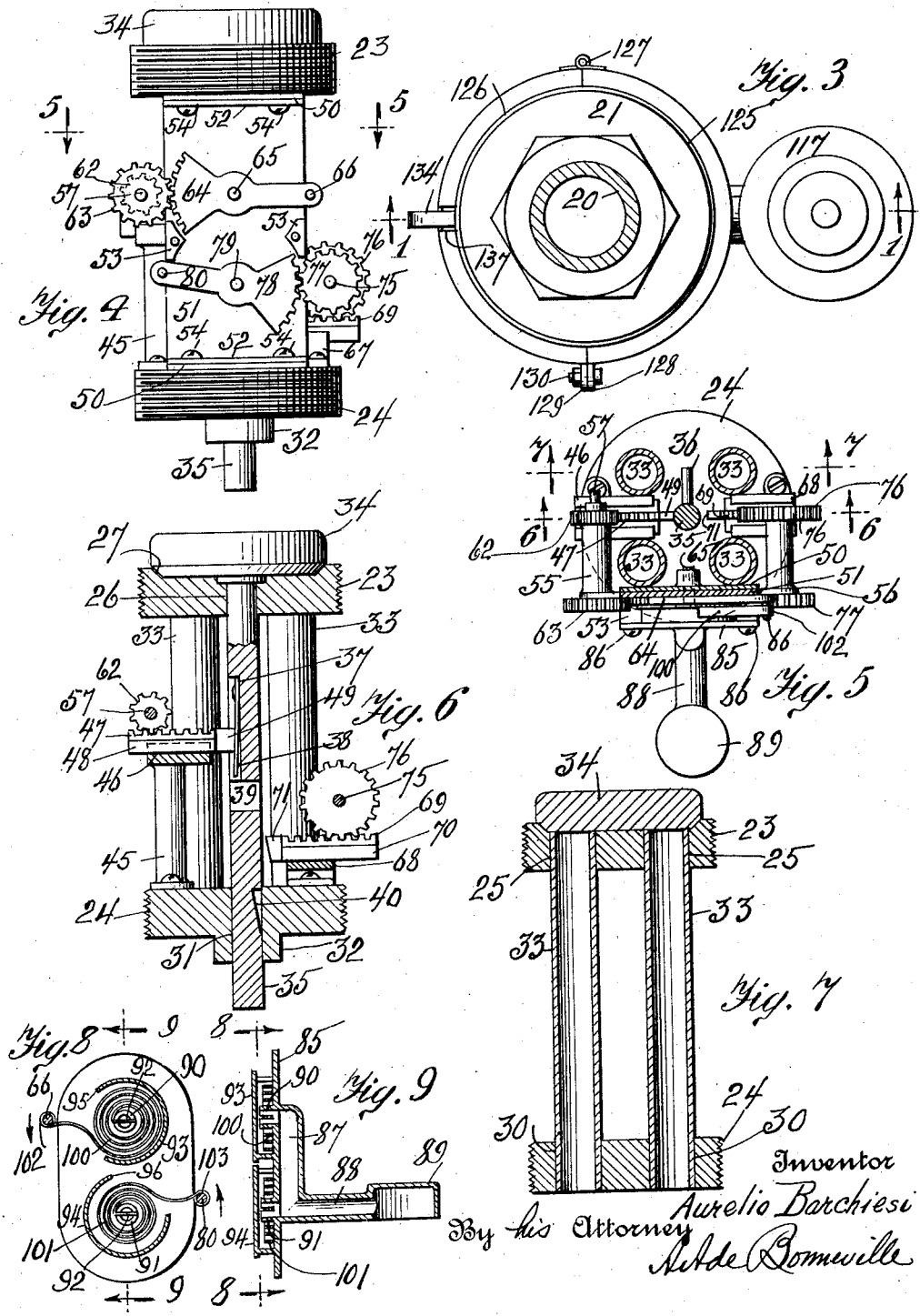
Inventor
Aurelio Barchiesi
By his Attorney

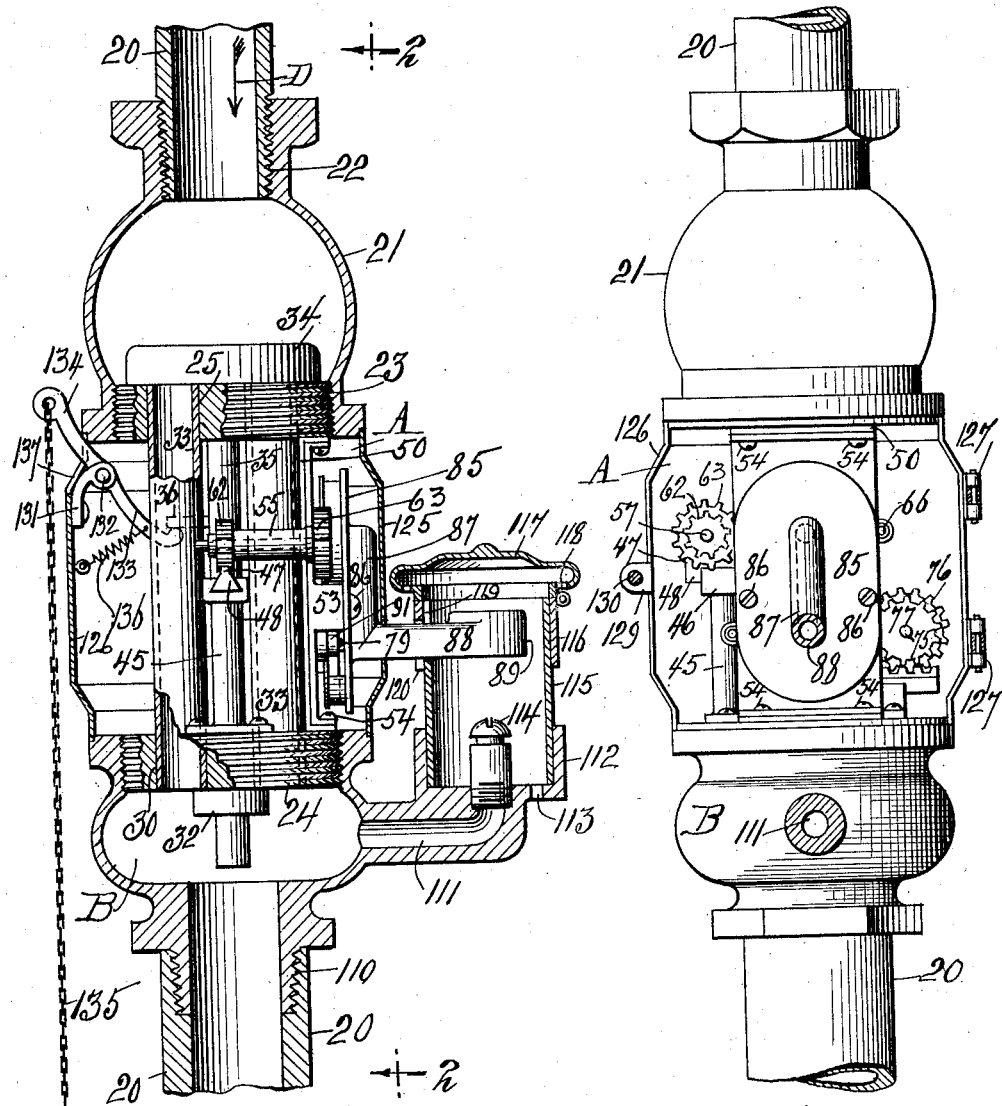

UNITED STATES PATENT OFFICE.

AURELIO BARCHIESI, OF JERSEY CITY, NEW JERSEY, ASSIGNOR OF TWO-FIFTHS TO ANGELO BARATTA, OF JERSEY CITY, NEW JERSEY, AND ONE-FIFTH TO GIOVANNI SQUARCIALUPI, OF NEW YORK, N. Y.

AUTOMATIC VALVE-CLOSER.

1,391,818.      Specification of Letters Patent.      Patented Sept. 27, 1921.

Application filed February 20, 1920. Serial No. 360,225.

*To all whom it may concern:*

Be it known that I, AURELIO BARCHIESI, a subject of King of Italy, and resident of Jersey City, in the county of Hudson and State of New Jersey, have invented certain new and useful Improvements in an Automatic Valve-Closer, of which the following is a specification.

This invention relates to an automatic valve closer, and has for its object the production of a device, whereby the flow of gas in a gas conduit is automatically turned off, in case the light of any gas tip and the like that is fed by the conduit is extinguished without shutting it off by its regular gas cock.

The organization of the invention primarily comprises a valve which shuts off the flow of gas in the conduit and which valve is caused to be seated on its seat by the expansive effect of springs or mechanism that will cause the valve to move.

Figure 1 is a partial section as on the line 1, 1, of Fig. 3; Fig. 2 is a right hand side view and section of Fig. 1 on the line 2, 2; Fig. 3 is a top plan view of Fig. 2; Fig. 4 is a right hand side view of some of the elements shown in Fig. 1; Fig. 5 shows a section of Fig. 4 on the line 5, 5; Fig. 6 shows a partial section of Fig. 5 on the line 6, 6; Fig. 7 represents a section on the line 7, 7 of Fig. 5; Fig. 8 is a section on the line 8, 8 of Fig. 9 and Fig. 9 shows a section on the line 9, 9 of Fig. 8.

The automatic valve closer has its top and bottom ends connected to the gas conduit 20. A valve chamber 21 of the closer is threaded at 22 for one end of the conduit 20.

A conduit and controlling support designated in its entirety by the letter A, comprises exteriorly threaded head 23 and the exteriorly threaded base 24. The head 23 has formed therein the four ports 25, the guide opening 26 and the valve seat 27. The base 24 has formed therein the ports 30 in line with the ports 25 and the guide opening 31, which latter is in line with the guide opening 26. A lug 32 extends from the base 24 to lengthen the guide opening 31. Gas conduits 33 connect the ports 25 and 30. A valve 34 has extending therefrom the valve stem 35, and the latter carries the lifting pin 36. A guide recess 37 is formed in the valve stem 35 and a flat leaf spring 38 located in said recess 37 has one end thereof fastened therein.

A stop or locking opening 39 is formed in the valve stem 35 below the guide recess 37, and a trip notch 40 is formed in said stem below the opening 39 and is on the side opposite the guide recess 37. A supporting guide bracket 45 is fastened to the base 24 and has formed in its upper end the dovetailed guide 46. A rack 47 with the dovetailed base 48 is slidably supported in the dovetailed guide 46. A toe 49 is formed with the base 48 and registers with the guide recess 37. A sheet 50 of non-heat conducting material bears against a couple of the conduits 33, and a plate bracket 51 bears against said sheet. Flanges 52 and lugs 53 are formed with the plate bracket 51. Screws 54 secure the flanges 52 to the head 23 and to the base 24.

Journal lugs 55 and 56 are formed with the plate bracket 51. In the journal lug 55 is journaled a spindle 57 which has fastened thereto the spur gear 62 and larger spur gear 63. The spur gear 62 meshes with the rack 47. A gear segment 64 is pivoted to plate bracket 51 on the pivot 65. The teeth of gear segment 64 mesh with the spur gear 63. The other end of the gear segment carries a pin 66. A supporting and guide bracket 67 is secured to the base 24 and has formed in its upper end the dovetailed guide 68. A rack 69 with the dovetailed base 70 is slidably supported in the dovetailed guide 68. A toe 71 is formed with the base 70 which can register with the trip notch 40 of the valve stem 35. In the journal lug 56 is journaled a spindle 75 which has fastened thereto the spur gear 76 and the smaller spur gear 77. The latter is of the same diameter as the spur gear 63, and the spur gear 76 is larger in diameter than the spur gear 62. The spur gear 76 meshes with the rack 69. A gear segment 78 is pivoted to the plate bracket 51 on the pivot 79. The teeth of the segment 78 mesh with the spur gear 77 and its pitch radius equals the pitch radius of the segment 64. The other end of the gear segment 78 carries a pin 80. A spring supporting plate 85 is fastened to the lugs 53 by means of the screws 86. A heating channel is formed with the plate 85 and comprises the vertical member 87 and the horizontal member 88. With the latter is formed the cap 89. The sleeve 90 on the rear side of the plate 85 connects with the vertical member 87 and the sleeve 91 on the rear side of said plate 85 connects with the horizontal member 88. Both of the sleeves 90 and 91 have slots 92. Casings 93 and 94 are fastened to the rear side of the supporting plate 85. In side wall of the casing 93 is formed the opening 95 and in the side wall of the casing 94 is formed the opening 96.

A spiral spring 100 has one end inserted in the slots 92 of the sleeve 90 and a spiral spring 101 has one end inserted in the slots 92 of the sleeve 91. The other end of the spring 100 extends through the opening 95 and has formed therewith an eye 102. The other end of the spring 101 extends through the opening 96 and has formed therewith an eye 103. The eye 102 is engaged by the pin 66 and the eye 103 is engaged by the pin 80.

A gas chamber B has formed therewith the threaded shank 110 which is in threaded engagement with the lower portion of the conduit 20. The chamber B has extending therefrom the gas channel 111 which terminates in the cup 112 having the air openings 113. A gas tip 114 is threaded in the cup 112 and registers with the channel 111. A glass sleeve 115 is supported in the cup 112 and supports the cap 116. A cover 117 with the air openings 118 is hinged to the cap 116. Slots 119 and 120 are respectively formed in the glass sleeve 115 and in the cap 116 to permit the insertion of the wall of the channel 88 and the cap 89. A hinged cover is shown with the members 125 and 126 connected at one pair of edges by the hinges 127, while at their other ends are formed flanges 128 and 129 connected by the bolt 130. The said cover has extending from its inner surface a pivot bracket 131 in which is supported the pivot 132. A lifting lever is shown with the arms 133 and 134. The arm 133 coacts with the lifting pin 36 and to the arm 134 is fastened the valve lifting chain 135.

A spring 136 bears between the inner surface of the member 126 of the hinged cover and arm 133. The said hinged cover encircles the support A. An opening 137 is formed in the member 126 for the arm 134.

To operate the automatic valve closer it may be first considered that the valve 34 is in its closed position as indicated in the drawings. To use the valve closer the operator pulls the lifting chain 135 which causes the arm 133 of the lifting lever to engage the lifting pin 36. By this means the valve 34 with its stem 35 are lifted to their raised or upper position, until the toe 49 of the dovetailed base 48 locks with the stop or locking opening 39, which locks the valve 34 in its raised position. Before the valve 34 is raised, the toe 49 bears against the spring 28, by virtue of the tension of the spring 100. When the toe 49 is opposite the opening 39, the segment 64 turns the spur gear 63 and thereby the spur gear 62 causes the rack 47 to move the toe 49 into the opening 39. The gas will now flow through the gas conduit 20 in the direction of the arrow D by way of the gas conduits 33, and from the chamber B to the tip 114. The operator next lights the gas at the tip 114, whereby heated air flows through the channels 88 and 87 and into the casings 92 and 93. The heated air expands both the springs 100 and 101. When the spring 101 expands it causes the rack 69 to move inwardly toward the stem 35 and thereby the toe 71 locks with the trip notch 40, and holds the stem 35 with its valve 34 in its raised position. The spring 100 also expands and causes the toe 49 to disengage from the stop opening 39, and which occurs after the toe 71 is engaged with the notch 40, because the spur gear 76 is larger in diameter than the spur gear 62. The gas flows now in the regular way through the automatic valve closer.

In case the flow of the gas is interrupted, the light from the tip 114 will be extinguished, and the springs 100, 101 will cool and contract. Under these conditions the valve 34 should close and the flow of gas should be interrupted. This is accomplished by virtue of the toe 71 first disengaging from the stop notch 40. The larger gear 76 operates the rack 69 in a shorter interval of time than the small gear 62 operates the rack 46. The stem 35 with its valve 34 will now drop to its closed position and shortly thereafter the rack 47 moves inwardly and the toe 49 bears against the leaf spring 38.

Having described my invention what I desire to secure by Letters Patent and claim is:

1. In an automatic valve closer the combination of a valve for a gas conduit, a stem for the valve, means to manually raise the valve, a spring actuated toe normally locking said stem in position, means to heat the spring of said toe and thereby unlock it from the stem, a second spring actuated toe locking with said stem when the spring thereof is heated and releasing the said valve stem when the latter spring is at its normal temperature.

2. In an automatic valve closer the combination of a valve chamber at the upper end thereof, a gas chamber at the lower end thereof, gas conduits connecting the chambers, a valve in the valve chamber for said conduits, a stem having a stop opening and a trip notch for the valve, manual means to raise the valve, a heat actuated spring toe for the stop opening and a heat actuated spring toe for the trip notch.

3. In an automatic valve closer the combination of a valve chamber at the upper end thereof, a gas chamber at the lower end thereof, a lighted gas tip fed with gas from the lower chamber, gas conduits connecting the chambers, a valve in the valve chamber, a stem having a stop opening and a trip notch for the valve, manual means to raise the valve, a pair of springs in the valve closer and subjected to heated air produced by the heat of the gas tip, and a rack with a toe coacting with each spring and actuated by the expansion and contraction thereof, one of said toes coacting with the stop opening and the other toe coacting with said trip notch.

4. In an automatic valve closer the combination of a valve chamber at the upper end thereof, an inlet end of a gas conduit connected to the valve chamber, a gas chamber at the lower end of the valve closer, a gas conduit leading from the gas chamber, gas conduits connecting the chambers, a valve in the valve chamber, a stem having a stop opening and a trip notch for the valve, a pair of springs in the valve closer, a lighted gas tip fed with gas from the gas chamber, means to manually raise the valve, a pair of springs in the valve closer, a pair of gear segments pivoted in the valve closer, one end of one segment pinned to one end of one spring, and one end of the second segment pinned to one end of the second spring, a pair of racks each with a toe slidably supported in the valve closer, a spindle journaled adjacent to the teeth of each gear segment and a pair of spur gears fastened to each spindle, one gear of each pair meshing with the teeth of its adjacent gear segment, the second gear of each spindle meshing with its adjacent rack, one of the latter gears being larger than the other.

5. In an automatic valve closer the combination of a valve chamber at the upper end thereof, a gas chamber at the lower end thereof, gas conduits connecting the chambers, a valve in the valve chamber for said conduits, a stem having a stop notch opening and a trip notch for the valve, a lifting pin extending from the stem, a cover around the conduits, a lifting lever with a pair of arms pivoted within the cover, one of said arms coacting with the lifting pin and the other arm extending through an opening in the cover, a lifting chain connected to the latter arm, a heat actuated spring toe for the stop opening and a heat actuated spring toe for the trip notch.

6. In an automatic valve closer the combination of a valve chamber at the upper end thereof, a gas chamber at the lower end thereof, gas conduits connecting the chambers, a valve in the valve chamber for said conduits, means to raise the valve, a stem having a stop notch opening and a trip notch for the valve, a toe slidably supported in the valve closer for the stop notch opening, a second toe slidably supported in the valve closer for the trip notch, a spring in the closer coacting with one of said toes, a second spring in the closer coacting with the second toe, a gas channel leading from the gas chamber, a tip at the outer end of the channel, a cap vertically above said tip, a horizontal channel for air extending from the cap to one of said springs and a second channel leading from the first channel for air and extending to the second spring.

Signed at the borough of Manhattan, city of New York, in the county of New York and State of New York, this 18th day of February, A. D. 1920.

AURELIO BARCHIESI.